Aug. 27, 1940.  W. J. HAWKINS ET AL  2,212,916
COOLING TUNNEL
Filed Dec. 30, 1936  2 Sheets-Sheet 1

W. J. HAWKINS
E. T. OAKES
INVENTOR

BY Henry Savage
ATTORNEY

Aug. 27, 1940.　　W. J. HAWKINS ET AL　　2,212,916
COOLING TUNNEL
Filed Dec. 30, 1936　　2 Sheets-Sheet 2
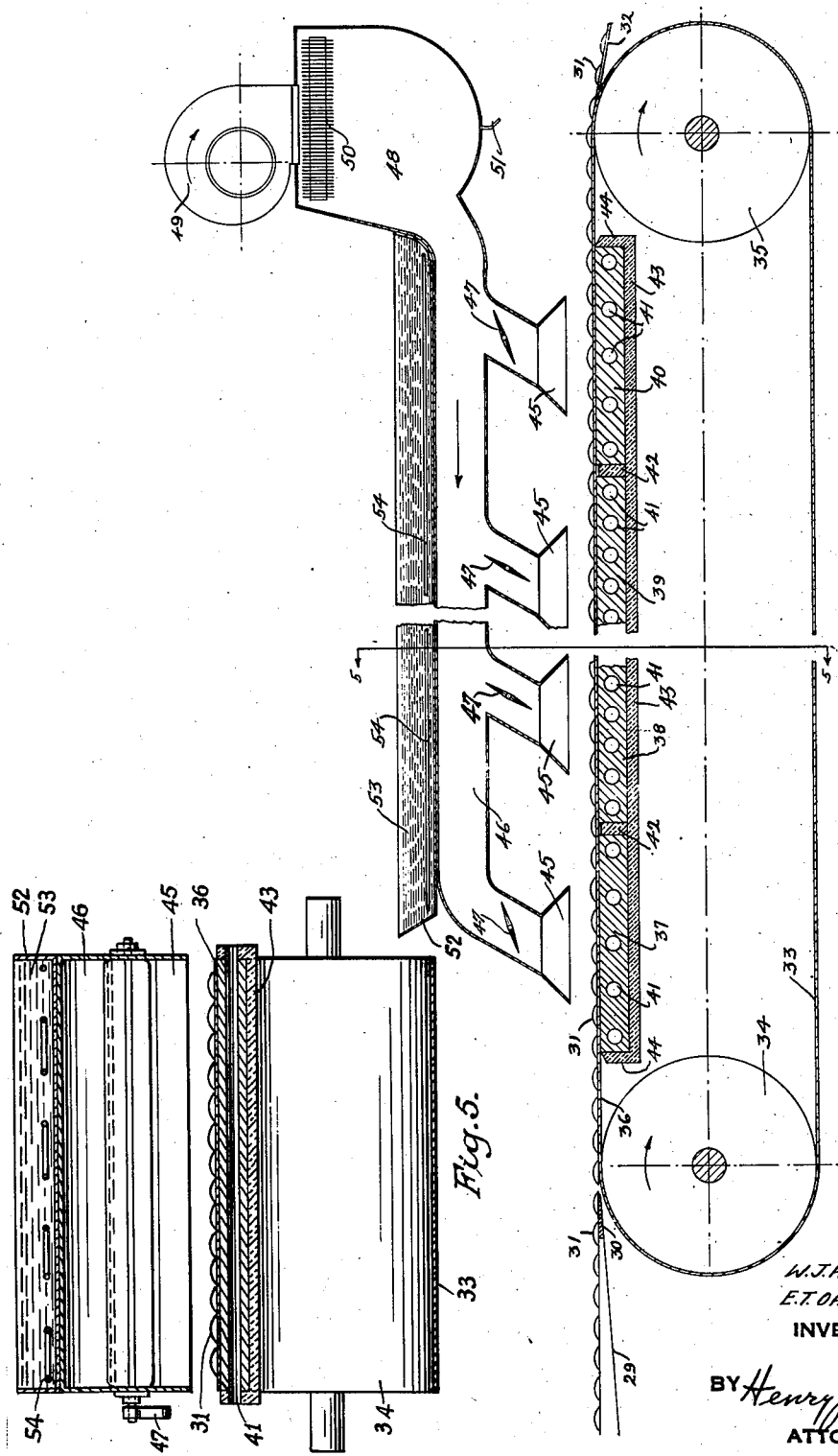
W.J. HAWKINS
E.T. OAKES
INVENTOR
BY Henry Savage
ATTORNEY Patented Aug. 27, 1940

2,212,916

UNITED STATES PATENT OFFICE 2,212,916

COOLING TUNNEL

Wilford Judson Hawkins, Claiborne, Md., and Earle T. Oakes, Douglaston, N. Y., assignors to National Biscuit Company, New York, N. Y., a corporation of New Jersey Application December 30, 1936, Serial No. 118,222

12 Claims. (Cl. 62—102)

Our invention relates to cooling tunnels and particularly to a cooling tunnel for enrobed or iced bakery products, confections, candies and the like. When cakes, cookies, candy and similar products are coated or enrobed with icing, chocolate, etc., the coating material must be in a liquid or semi-liquid state, and its fluidity is obtained by heat, that is, the coating material must be kept hot enough to flow readily. It sets or hardens upon cooling, but this takes considerable time if accomplished at room temperature and delays packing of the finished products which cannot be packaged until the coating has hardened.

Many substances upon cooling pass through a recalescence point where they give off a large quantity of heat which, if not promptly absorbed, results in an actual rise in temperature, even though the cooling agency remains constant. This is particularly true of chocolate which also has a tendency to develop a grayish bloom upon cooling, unless the cooling is properly controlled.

The principal object of the present invention therefore is to provide means for quickly and efficiently cooling or hardening enrobed and iced cakes, candies, etc.

Another object of the invention is to provide a cooling tunnel wherein the amount of cooling agent supplied at any point, or the cooling effect at any point in the tunnel may be varied and controlled to meet the requirements of the products being cooled.

Another object of the invention is to provide a cooling tunnel wherein the increased heat given off by a product at its recalescence point will be efficiently absorbed by the cooling medium.

Another object of the invention is to provide a cooling tunnel wherein both the time and length of travel of the products therethrough are greatly decreased.

Another object is to lower the cost and operation of cooling devices of this character, increase their speed and efficiency and at the same time improve the quality of the articles that are cooled.

The above and other objects of the invention are attained by the embodiments thereof that we have shown in the accompanying drawings which are but illustrative of many forms that our invention may take.

Figure 1:
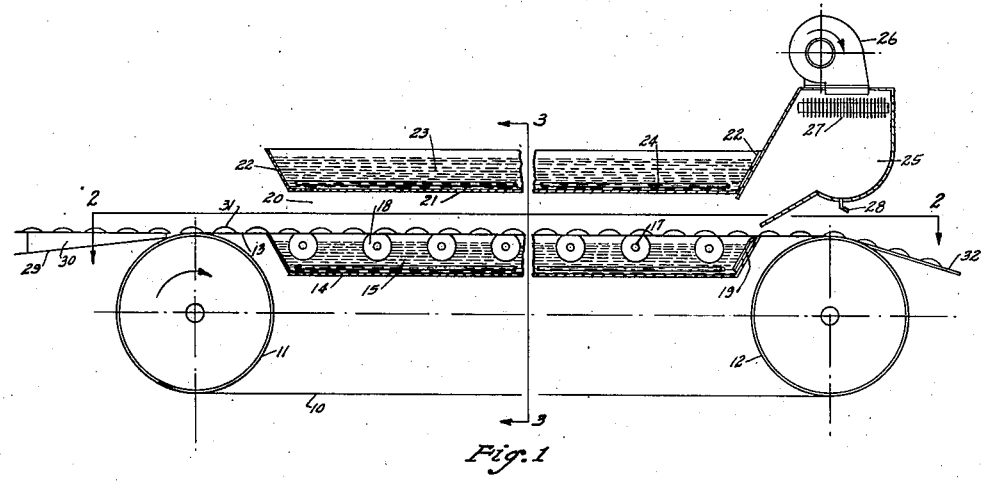
Figure 2:
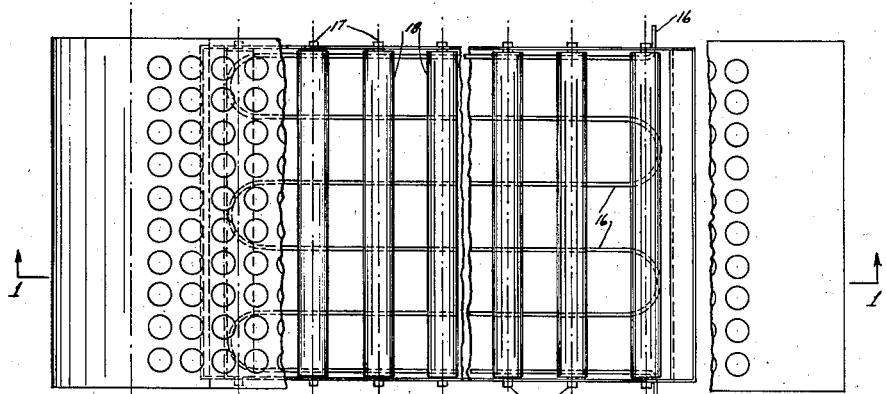
Figure 3:
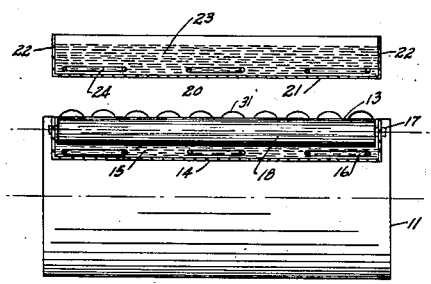

Fig. 1 is a longitudinal section taken substantially on the line 1—1 of Fig. 2 of a cooling device made in accordance with our invention; Fig. 2 is a plan view, looking in the direction of the arrows 2—2 of Fig. 1, with part of the apron broken away, the side panels and supporting frame being omitted since the latter, per se, form no part of the invention; Fig. 3 is a section taken substantially on the line 3—3 of Fig. 1; Fig. 4 is a section through a cooling device wherein the rate of cooling the articles may be varied and controlled at different points in their path of travel; and Fig. 5 is a section taken substantially on the line 5—5 of Fig. 4.

An endless metal belt or conveyor 10 is mounted on a pair of drums, 11, 12, which drive it at appropriate speed and to one of which power is applied. The upper run 13 of the conveyor passes over a container 14, the upper edges of which are very close to the underside of the belt, and which is filled with a cooling fluid 15, the temperature of which is regulated by cooling coils 16 through which a solution of calcium chloride or other refrigerant may be circulated. A number of parallel shafts 17 are mounted in the sides of the vessel 14 and each of them carries a soft sponge roller or brush 18, the upper sides of which contact with the undersurface of the band 13 so as to be slightly flattened. These rollers are immersed in the cooling fluid 15 in the reservoir and carry it up to the underside of the band so as to keep it cooled. Rotation of the drums 11 and 12 in Fig. 1 is clockwise so that the travel of the upper run of the band is from left to right. The band is cooled by its contact with the rollers 18 as it travels over the vessel 14 and at the trailing edge of the vessel there is mounted a scraper 19, which removes any cooling fluid that adheres to the band and returns it to the vessel 14.

A cooling duct 20 is provided above the band and its upper wall 21 may have upwardly extending extensions 22 so as to form a vessel for holding the cooling fluid 23, whose temperature is kept constant by the cooling coils 24. This duct is closed on the two sides by sheet metal covers not shown in the drawings. It is open at one end and at the other end communicates with an air chamber 25 to which air is supplied by a blower 26. The air from the blower passes over refrigerating coils 27, where it is chilled, and all moisture which condenses in the chamber 25 passes out through a drain 28 where it is led away from the machine.

Enrobed biscuits or other products that are to be cooled are delivered to the upper run of the conveyor 13 by an apron 29 passing over a stationary knife edge 30. These biscuits 31 are cooled on their undersurface by contact with the conveyor 13 which is made from metal, preferably polished steel or other good heat conductor to which the articles will not adhere, and their upper surface is cooled by a current of air passing through the cooling duct 26 from the air chamber 25. The drums 11, 12, will be spaced far enough apart and the conveyor 10 will be of sufficient length that the products will be thoroughly cooled, hardened, or set while passing through the cooling duct or from one drum to the other. At the trailing edge, the cooled or hardened products are delivered to the chute 32 which in turn delivers them to the packing table or other point of delivery.

The rollers 18 can be made from any suitable material such as synthetic rubber, felt, bristles and the like and in some cases wicks may be relied upon to keep cooling fluid in contact with the lower surface of the band.

In Figs. 4 and 5, we have shown what we now believe to be a preferred form of our invention. The endless band 33 of stainless steel or other suitable metal passes over drums 34, 35, one of which is power driven. The upper run 36 of the band travels in contact with a stationary cooling block formed in sections 37, 38, 39, 40 and made of aluminum or other good heat conductor. The sections are provided with passages 41 through which a refrigerant is circulated. The sections may abut or be separated by insulation 42 and are covered on the bottom and sides by insulation 43, 44. The passages 41 are closer together in some sections than in others, their number and proximity being selected to give the rate of cooling that is required in the zone or region where that particular block is located. Thus in the region where the chocolate recalesces, the passages 41 will be closest together so that a maximum cooling effect will be obtained.

The articles on the band are cooled from above by cold dry air from wide nozzles 45 leading from a common duct 46 and controlled by dampers 47. The nozzles 45 are of such size and spaced at such distances apart as to produce the desired cooling effect at each point in the travel of the band 33. Also the dampers 47 can be set to further regulate the rate of cooling. The duct 46 leads from the air chamber 48 to which air is supplied by the blower 49. A refrigerating coil 50 cools the air from the blower and the moisture that collects in chamber 48 is let off through a drain 51 so that only dry cool air is supplied to the cooling duct.

A cooling vessel 52 may be placed in contact with the upper wall of the cooling duct 46 and is filled with a cooling liquid 53 such as transformer oil, within which the cooling coils 54 are immersed. The cooling vessels 52 and 22 (Figs. 4 and 1) are not essential to the invention, and in fact are not used when the articles being cooled, such as chocolate goods and candies, may be affected by moisture from these vessels.

While we have shown the nozzles 45 as discharging to the atmosphere as an open circuit, they discharge in some cases into a return duct (not shown) which leads all or a part of the air back to the blower 49, thus effecting an economy in the refrigerating effort, that would not be attained in an open circuit.

The under side of the belt 33 may be roughened so as to accelerate heat transfer to the cooling fluid in Fig. 1 or the cooling blocks 37 in Fig. 4. The biscuit, or other products, 31 are fed to the belt 33 from an apron 29 passing around a stationary knife edge 30 and are delivered at the opposite end to a chute 32, similar to Fig. 1.

The temperature of the cooling liquid, cooling blocks, cooling air and positions of the dampers are thermostatically controlled so as to maintain predetermined temperature conditions in the different parts and zones of the apparatus, but we have not illustrated these controls since any commercial form of them that is adapted to the purpose may be used.

In Figs. 1 and 4, we have shown the device broken in two, this to indicate that it may be of any desired length and not limited to the proportions or number of units or zones illustrated.

With the present invention we are able to decrease the time within which chocolate goods, either solid or enrobed, may be cooled without causing bloom from an average of twenty-five minutes to five minutes and the length of the cooling means from one hundred fifty feet to thirty feet, with corresponding savings in floor space, cost of equipment, and operation.

While we have described and illustrated our invention as adapted to cooling enrobed biscuits, it will of course be understood that it can be used for the treatment of many other articles, including candies and confections and other products which harden or set upon being cooled.

The drawings and description are but illustrative of one form that the invention may take and many other modifications and embodiments thereof will readily suggest themselves to those skilled in this art and we claim as our invention all such that come within the scope or spirit of our claims.

What we claim is:

1. In a cooling device, the combination of an endless conveyor having horizontal upper and lower runs, means for driving the conveyor, means for delivering articles to be cooled to the upper run at one end and removing them at the other, a container for cooling liquid, and means partly immersed in the cooling liquid and contacting the lower side of the upper run to cool the same.

2. In a cooling device, the combination of an endless conveyor having horizontal upper and lower runs, means for driving the conveyor, means for delivering articles to be cooled to the upper run at one end and removing them at the other, a container for cooling liquid, means for cooling the liquid therein, and brushes dipping into the cooling liquid mounted on said container and contacting the lower side of the upper run.

3. In a cooling device, the combination of an endless conveyor having horizontal upper and lower runs, means for driving the conveyor, means for delivering articles to be cooled to the upper run at one end and removing them at the other, a container for cooling liquid having an open top mounted below said upper run, means for cooling the liquid in the container, a plurality of rotatable brushes mounted on said container, the lower sides of the brushes dipping into the cooling liquid and their top sides contacting the lower side of said upper run, whereby movement of the conveyor will cause rotation of the brushes and cool said upper run.

4. In a cooling device, the combination of an endless conveyor having horizontal upper and lower runs, means for driving the conveyor, means for delivering articles to be cooled to the upper run at one end and removing them at the other, a container for cooling liquid, means for cooling the liquid therein, brushes dipping into the cooling liquid mounted on said container and contacting the lower side of the upper run, and means beyond said brushes in the direction of conveyor travel to remove the cooling fluid from said conveyor.

5. In a cooling device, the combination of an endless conveyor having horizontal upper and lower runs, means for driving the conveyor, means for delivering articles to be cooled to the upper run at one end and removing them at the other, a container for cooling liquid, means partly immersed in the cooling liquid and contacting the lower side of the upper run to cool the same, a cooling duct in which said upper run forms the lower wall, a blower delivering air to one end of said duct, a cooler in the passageway from said blower to cool the air entering said duct, the flow of air through said duct being counter to the direction of travel of said upper run.

6. In a cooling device, the combination of an endless conveyor having horizontal upper and lower runs, means for driving the conveyor, means for delivering articles to be cooled to the upper run at one end and removing them at the other, a container for cooling liquid, means partly immersed in the cooling liquid and contacting the lower side of the upper run to cool the same, a cooling duct in which said upper run forms the lower wall, a blower delivering air to one end of said duct, a cooler in the passageway from said blower to cool the air entering said duct, the flow of air through said duct being counter to the direction of travel of said upper run, and means for removing condensation from the cooled air before it enters the cooling duct.

7. In a cooling device, the combination of an endless conveyor having horizontal upper and lower runs, means for driving the conveyor, means for delivering articles to be cooled to the upper run at one end and removing them at the other, a cooling duct in which said upper run forms the lower wall, a container for cooling liquid forming the upper wall, a blower delivering air to one end of said duct, a cooler in the passageway leading from the blower to the cooling duct, the cooling air being supplied to the duct adjacent the end where the upper run leaves the same, whereby the flow of cooling air is counter to the movement of the conveyor.

8. In a cooling device, the combination of an endless sheet metal conveyor having upper and lower runs, means for supplying articles to be cooled to the upper run, a stationary cooling block contacting the under side of said upper run, said block having a number of passages for the circulation of a cooling fluid, the cooling passages being greatest in number in that region where the greatest amount of heat is to be absorbed from the articles.

9. In a cooling device, the combination of an endless sheet metal conveyor having upper and lower runs, means for supplying articles to be cooled to the upper run, a stationary cooling block contacting the under side of said upper run, said block being formed in a number of sections over which said conveyor successively passes, cooling passages provided in each section, the number of cooling passages in one of the intermediate sections being greater than those in the end sections.

10. In the combination of an endless conveyor having upper and lower runs and a cooling apparatus through which the upper run passes; a cooling apparatus comprising a cooling chamber, means for supplying cool dry air to said chamber, a cooling duct leading from said chamber over said upper run, a number of nozzles discharging from said duct over said upper run, means for controlling the amount of air passing through each of said nozzles, and means for cooling the lower side of said upper run.

11. In the combination of an endless conveyor having upper and lower runs and a cooling apparatus through which the upper run passes; a cooling apparatus comprising a cooling chamber, means for supplying cool dry air to said chamber, a cooling duct leading from said chamber over said upper run, a number of nozzles discharging from said duct over said upper run, means for controlling the amount of air passing through each of said nozzles, and means for cooling the lower side of said upper run, said nozzles and lower cooling means being arranged to produce the greatest cooling effect intermediate the ends of said tunnel.

12. In a cooling device, the combination of an endless sheet metal conveyor having upper and lower runs, means for supplying articles to be cooled to the upper run, a stationary cooling member contacting the under side of said upper run, said member being formed in a number of sections, each section having passages for circulating cooling fluid therethrough, and said passages being arranged so that the rate of cooling effected by some sections varies from that effected by others.

EARLE T. OAKES.
WILFORD JUDSON HAWKINS.